(12) United States Patent
Sharir

(10) Patent No.: US 8,951,411 B2
(45) Date of Patent: Feb. 10, 2015

(54) APPARATUS FOR WASTE-WATER FILTRATION

(76) Inventor: Eitan Sharir, Gan Yavne (IL)

( * ) Notice: Subject to any disclaimer, the term of this patent is extended or adjusted under 35 U.S.C. 154(b) by 394 days.

(21) Appl. No.: 13/470,136

(22) Filed: May 11, 2012

(65) Prior Publication Data
US 2012/0305460 A1    Dec. 6, 2012

Related U.S. Application Data

(63) Continuation-in-part of application No. 12/405,898, filed on Mar. 17, 2009, now Pat. No. 8,197,680.

(30) Foreign Application Priority Data

Apr. 2, 2008    (IL) .................................... 190571

(51) Int. Cl.
| | |
|---|---|
| B01D 25/28 | (2006.01) |
| B01D 25/32 | (2006.01) |
| B01D 29/23 | (2006.01) |
| B01D 29/82 | (2006.01) |
| B01D 29/94 | (2006.01) |
| B01D 29/68 | (2006.01) |
| B01D 35/143 | (2006.01) |
| C02F 11/12 | (2006.01) |
| C02F 11/14 | (2006.01) |

(52) U.S. Cl.
CPC .............. *B01D 29/23* (2013.01); *B01D 29/822* (2013.01); *B01D 2201/084* (2013.01); *B01D 29/684* (2013.01); *B01D 29/94* (2013.01); *B01D 2201/54* (2013.01); *B01D 35/143* (2013.01); *C02F 11/121* (2013.01); *C02F 11/14* (2013.01); *C02F 2209/005* (2013.01); *C01D 2201/0415* (2013.01)
USPC ............. 210/86; 210/108; 210/111; 210/143; 210/350; 210/411; 210/414; 210/497.01

(58) Field of Classification Search
None
See application file for complete search history.

(56) References Cited

U.S. PATENT DOCUMENTS

| | | | | |
|---|---|---|---|---|
| 3,276,594 | A | * | 10/1966 | Gwilliam ...................... 210/350 |
| 3,762,560 | A | * | 10/1973 | Gwilliam ...................... 210/350 |
| 4,714,557 | A | * | 12/1987 | Croket .......................... 210/769 |
| 5,614,092 | A | | 3/1997 | Di Leo |

OTHER PUBLICATIONS

"WL200 Conductive Level Controller." Global Water—a xylem brand. http://www.globalw.com/support/wl200install.html.

* cited by examiner

*Primary Examiner* — Terry Cecil
(74) *Attorney, Agent, or Firm* — Ladas & Parry, LLP

(57) ABSTRACT

A multi-step press apparatus for sludge dewatering and waste water filtration comprising: a tank, an inflatable membrane, a level sensor, and a nozzle assembly.

5 Claims, 17 Drawing Sheets

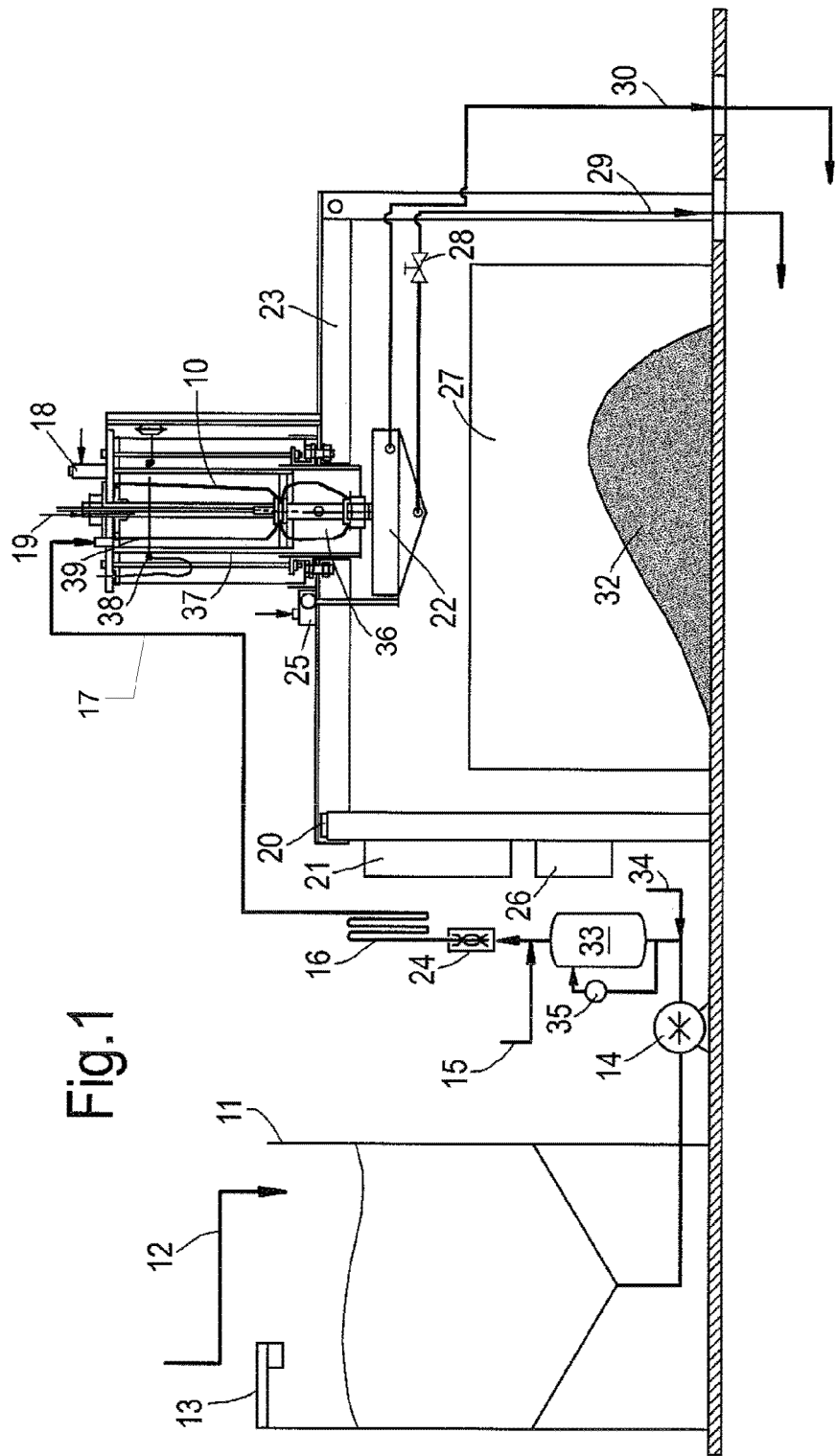

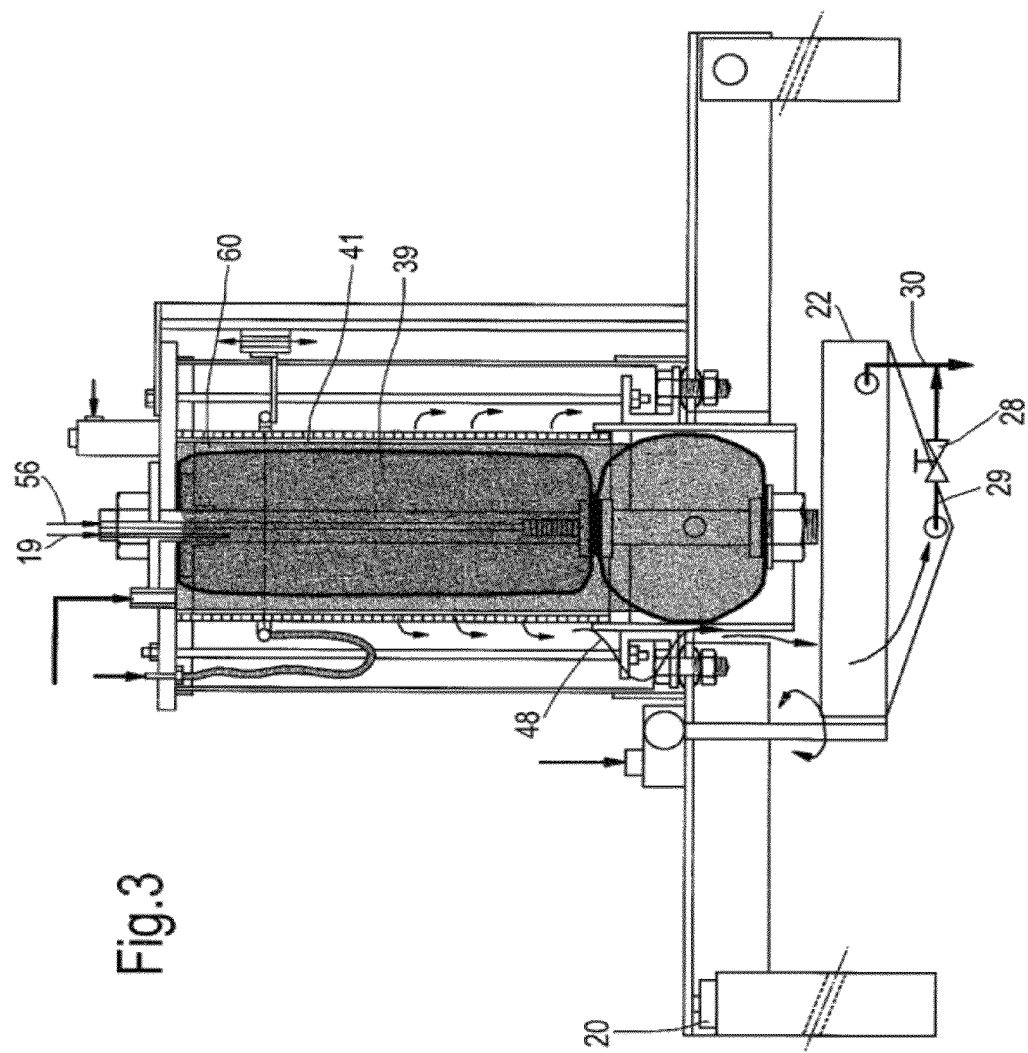

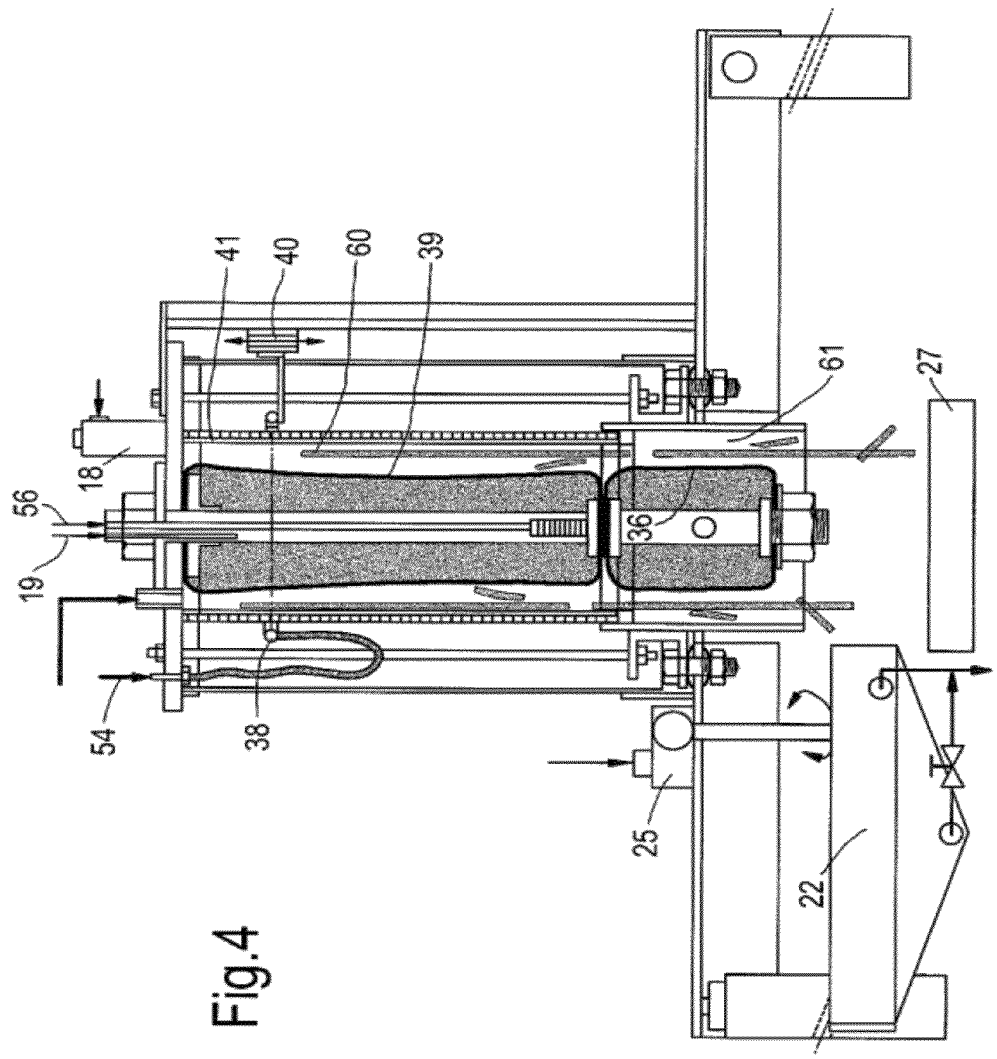

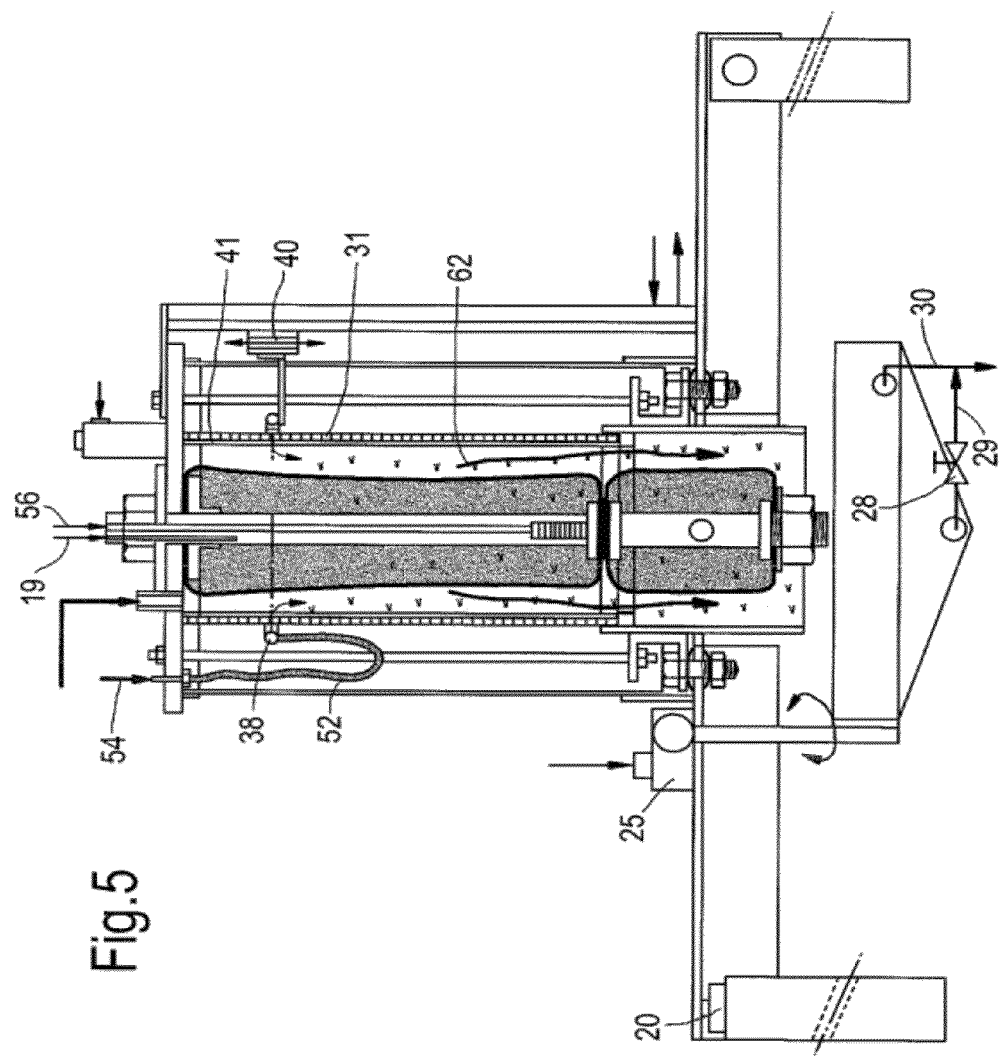

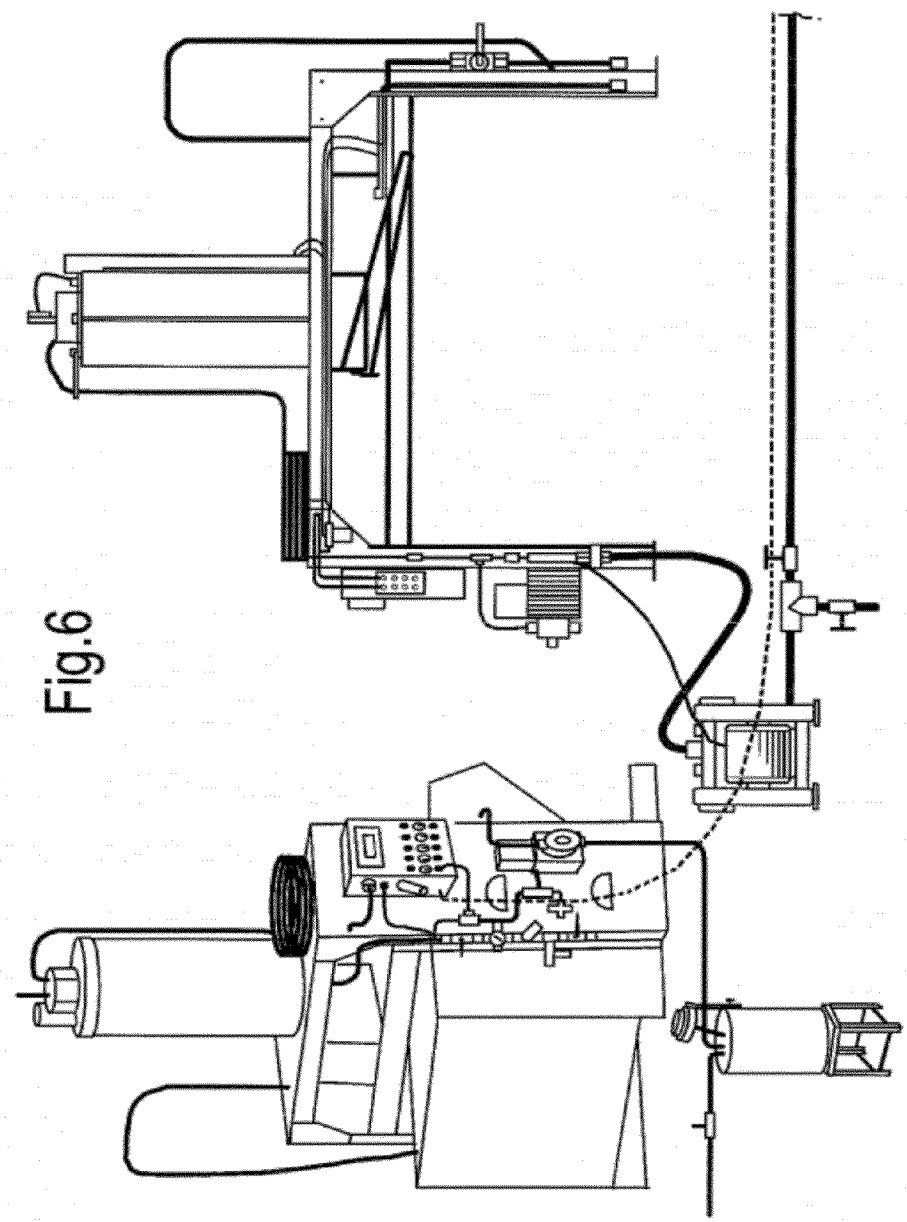

APPARATUS FOR WASTE-WATER FILTRATION

CROSS REFERENCE TO RELATED APPLICATIONS

This application claims the benefit of U.S. patent application Ser. No. 12/405,898, filed on Mar. 17, 2009, now U.S. Pat. No. 8,197,686, entitled "Apparatus for Waste-Water Filtration," which claims priority to Israeli Patent Application No. 190,571, filed on Apr. 2, 2008, entitled "Apparatus for Waste-Water Filtration," the disclosures of which are incorporated by reference in their entireties.

BACKGROUND

Many innovative sludge dewatering technologies and products have been implemented in order to address issues related to better performance, higher throughput or cost efficiency. Due to concerns about global warming and energy costs, there has been an effort to employ systems which consume less electrical power, chemicals and washing water.

Any wastewater and sludge process requires dewatering in order to minimize transportation and disposal volumes. Usually sludge is transported after the clarification, inefficiently, due to having a high, 89-90% liquid content.

As an example, with a daily wastewater volume of 100 cubic meters per day at solids concentration of 1000 parts per million, and when the clarifier used is DAF (dissolved air filtration), then an approximate sludge yield is approximately 2000 kg, or approximately 2 cubic meters per day, which contains approximately 5% dry solids. After pressing, the volume of this sludge that contains 30% Dry solids reaches approximately 330 liters (disposal volume).

The three major methods of achieving this dryness are plate filter press, belt press, and centrifugal decanter.

Belt press and centrifugal decanters have proven to be too large and uneconomical for the volume in the example above, besides having other drawbacks, such as high power consumption and being too mechanically complex and therefore costly.

Filter presses are usually manually operated and, therefore, require close operator attention. These presses quickly become dirty, necessitating periodical filter media cleaning.

In U.S. Pat. No. 5,614,092 to Di Leo, there is disclosed a filter system for the separation of solids and liquids from industrial muds. The filter in the system includes a deformable membrane and a fluid pump which varies the size of the volume of the membrane, thereby squeezing the filter.

While alleviating many of the tasks related to dewatering muds, such as squeezing and filtering, the filter disclosed in this patent does not address the need to minimize the down time due to the need to remove and clean the filter between the filtering operations, and, furthermore, does nothing to eliminate the need for man-hour input required for the cleaning.

SUMMARY

It is therefore desireable to obviate the disadvantages of prior art sludge filter and to provide a sludge filtering device which is capable of continuous operation and minimal or no down time.

It is also desireable to provide a sludge filtering device which is capable of high yield and would be easy to manufacture and operate.

In a first embodiment disclosed herein is a multi-stage press apparatus for automatic, PLC (programmable logic controller) controlled, sludge dewatering and waste water filtration, comprising:

a substantially cylindrical tank for receiving a mixture of sludge or waste water and coagulant, the cylindrical tank being designed to effectively allow suspended solids to be separated and later dewatered, and being provided with a lower, openable port for discharge of dewatered solids and having a substantially vertical cylindrical double layer mesh wired screen for discharge of cleared liquid;

a centralized inflatable membrane, positioned to press the solids against the screen, whereby a stream of discharged, cleared liquid, passes through the screen and is discharged to a sewage drain or a further tank, the screen being provided with perforations sized to enable the passage of clear liquid therethrough while retaining fine and coagulated solids on the internal surface thereof;

a load sensor in contact with the cylindrical tank to determine the combined weight of the apparatus and of solid and liquid internally retained thereon and to control the sequence of operation, and the filling and pressing duration as a function of the weight, whereby a solids cake of about 30 mm thickness of fine and coagulated solids is formed and retained on the internal surface of the fine screen layer, thereby improving the filtering and dewatering capacity of the apparatus, the apparatus further comprising a bottom opening with a second pneumatic inflatable membrane to seal and to open the bottom opening and thereby enabling downward discharge of solids into a sludge collecting bin;

a set of high pressure nozzles located on the external side of the mesh screen body, to efficiently wash the screen from outside to inside, the nozzles being operationally linked to a drive mechanism which moves the nozzle assembly up and down in response to a PLC command during the cleaning cycle; and a PLC provided to manage all cycles of operation along with pneumatic and other electrical control items to activate solenoid valves, pumps and load cells, and to provide for a continuous dewatering and filtration operation.

In a preferred embodiment of the present invention there is provided a press apparatus as defined above, further comprising a first tank provided with a sludge or waste water inlet pipe to supply sludge or waste water comprising a mixture of solids and liquid to the first tank; a pumping device, and a means for adding a coagulant to the sludge or waste water; and an outlet pipe leading to the cylindrical tank.

In another preferred embodiment of the present invention there is provided a press apparatus wherein the inflatable membrane is formed of rubber and is pneumatically inflatable.

In a further preferred embodiment of the present invention there is provided a press apparatus further comprising a pneumatic vibrator to improve the detachment of solids from the internal screen of the double layer mesh wired screen.

In a further preferred embodiment of the present invention there is provided a press apparatus further comprising a liquid collecting sump pan, which is pneumatically displaceable upon the washing cycle, the liquid collecting sump pan being located below the press bottom to collect the washing liquid into the sewage system or back to the processing tank.

In yet a further preferred embodiment of the present invention there is provided a press apparatus wherein the screen is coated with a non-stick material.

In another preferred embodiment of the present invention there is provided a press apparatus wherein the load sensor is also used for determining the rate of weight loss of the combined weight.

In another preferred embodiment of the present invention there is provided a press apparatus wherein the coagulants are selected from the group consisting of alum, ferric chloride, ferric sulfate, ferrous sulfate, titanium dioxide, lime, polyacrylates, cationic polyamines, cationic resin amines, cationic polyacrylamides and anionic polyacrylamides.

In another preferred embodiment of the present invention there is provided a press apparatus wherein the set of nozzles is disposed generally surrounding the external side of the screen.

In a most preferred embodiment of the present invention there is provided a press apparatus wherein the set of nozzles contains about 10 to about 30 nozzles.

In a most preferred embodiment of the present invention there is provided press apparatus wherein each of the nozzles ejects a jet of liquid.

In a most preferred embodiment of the present invention there is provided press apparatus wherein each of the nozzles ejects a jet of air.

In another embodiment disclosed herein is a multi-step press apparatus for automatic sludge dewatering and waste water filtration, comprising: a substantially cylindrical tank for receiving a mixture of sludge or waste water and coagulant, said cylindrical tank being designed to effectively allow suspended solids to be separated and later dewatered, and being provided with a lower, openable port for discharge of dewatered solids and having a substantially vertical cylindrical filter screen for discharge of cleared liquid; a centralized inflatable membrane, positioned to press said solids against said screen, whereby a stream of discharged, cleared liquid, passes through the screen and is discharged to a sewage drain or a further tank, said screen being provided with perforations sized to enable the passage of clear liquid there through while retaining fine and coagulated solids on the internal surface thereof; a level sensor to detect when said tank has received sufficient sludge or waste water as to render the tank substantially full and to control the sequence of operation, and the a filling and pressing duration as a function of said level, whereby a solids cake of about 30 mm thickness of fine and coagulated solids is formed and retained on the internal surface of the fine screen layer, thereby improving the filtering and dewatering capacity of the apparatus, said apparatus further comprising: a bottom opening with a second pneumatic inflatable membrane to seal and to open said bottom opening and thereby enabling downward discharge of solids into a sludge collecting bin; a nozzle assembly including a set of high pressure nozzles located on the external side of the double layer mesh wire screen body, to efficiently wash the screen from outside to inside, said nozzles being operationally linked to a drive mechanism which moves said nozzle assembly up and down in response to a controller command during the a cleaning cycle; and a controller provided to manage all cycles of operation along with pneumatic and other electrical control items to including activating solenoid valves, pumps and load cells, to provide for a continuous dewatering and filtration operation.

Yet further embodiments will be described hereinafter.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 1 is a general diagrammatic view of a preferred embodiment of the apparatus according to the invention;

FIG. 3 is a sectional view of the apparatus with the internal parts, at pressing cycle;

FIG. 4 is a sectional view of the apparatus with the internal parts, at unloading cycle;

FIG. 5 is a sectional view of the apparatus with the internal parts, at cleaning cycle; and FIG. 6 is a diagramatic description of sludge and wastewater modes.

DETAILED DESCRIPTION OF THE INVENTION

Figure 2A:
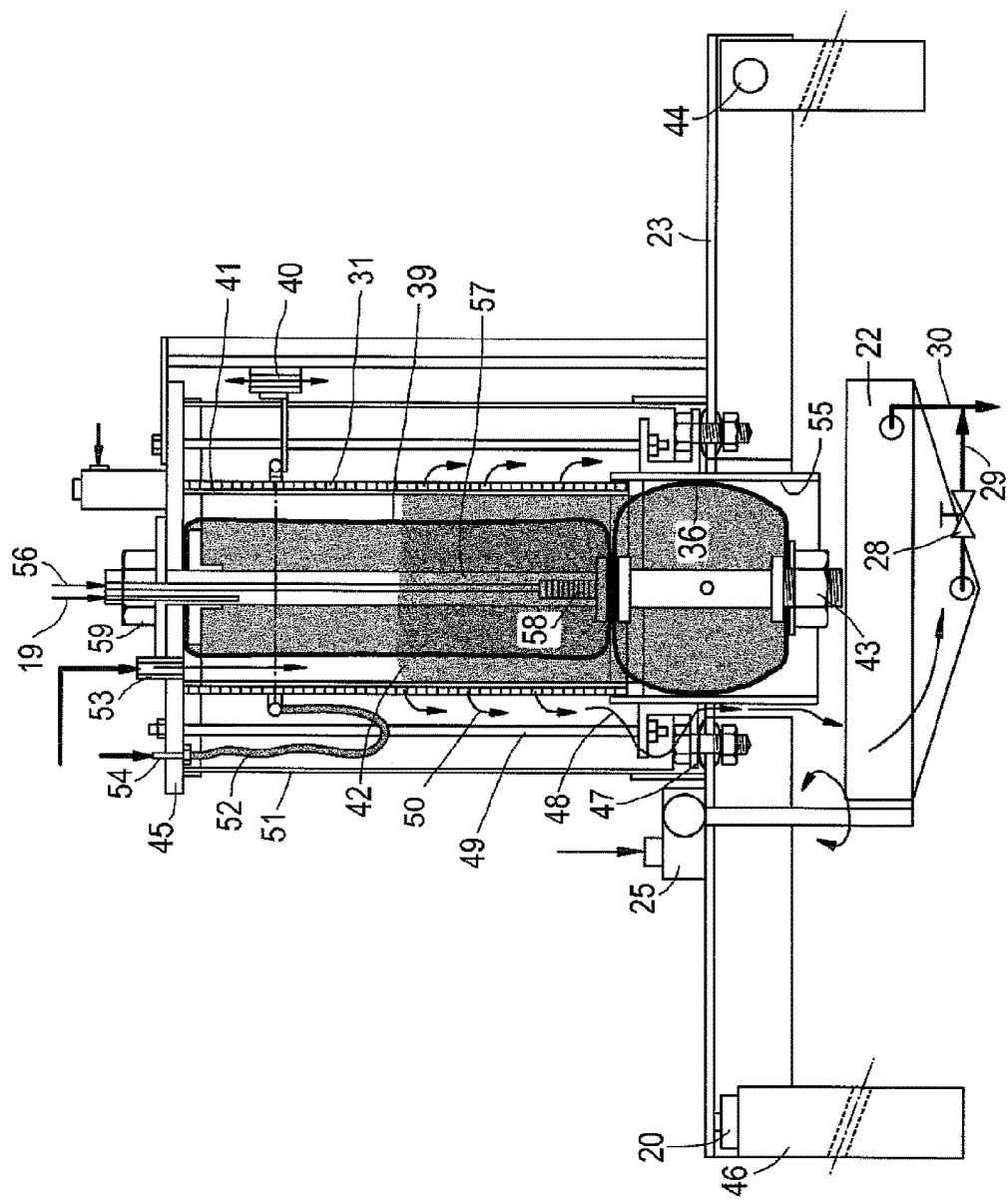
FIGS. 2a and 2b are sectional views of the apparatus with the internal parts, at filling cycle.

FIG. 1 shows one embodiment of a multi-stage apparatus 10 for continuous sludge dewatering and waste water treatment.

A first tank 11 is provided with a wastewater inlet pipe 12 arranged to supply thereinto sludge or waste water containing suspended solids. The first tank 12 is further provided with a coagulant inlet 34 to mix coagulant into the wastewater 12 introduced therein. The coagulant is activated while mixed in a tank 33 by a mixer, or circulation pump 35. Addition of the coagulant enhances the efficiency of operation of the subsequent stages, and further chemical additions may provided through an inlet 15, wherein activation thereof is performed by the static mixer 24, and activation duration is provided in a pipe flocculator 16.

Coagulant 34 may suitably be selected from the group consisting of alum, ferric chloride, ferric sulfate, ferrous sulfate, $TiO_2$, lime, and polyacrylate flocculent 15 such as cationic PAM (polyacrylamide), cationic polyamine, cationic resin amine and anionic PAM (polyacrylamide).

First tank 12 is provided with a pump 14 for feeding the sludge or wastewater according a command from a PLC 21. PLC 21 receives signals from a level detector 13 positioned on top of first tank 11. PLC 21 controls dosage of chemicals 34 and 15, as long as pump 14 operates.

As used herein, level detectors and level sensors can include one or more sensors useful for determining the level of a liquid, a solid and/or combinations thereof. Such sensors can include single point sensors (e.g. level switches) and continuous transmitters of a signal related to the level and combination level sensors. Such sensors can be based on any suitable technology, such as conductivity, magnetic, resistance, ultrasonic, capacitance, radar, laser, radiation, mechanical, pressure, differential pressure, weight, radio frequency, optical properties, as well as other technologies and combinations of technologies. Such sensors can be positioned, as appropriate for the device, in the cylinder or in some other portion of the filtration device, including the top or the bottom, or for some embodiments and for some technologies, nearby to the filtration device. In some embodiments, more than one level sensor can be used.

During a filling step, multistage press 10 is fed solids and liquid mixture via a conduit 17. Prior to the filling step, the weight of the empty press is detected by a load cell 20, and is registered by PLC 21.

In various embodiments, different types of controllers can be used in place of a PLC. As used herein, a controller can include one or more single loop controllers, PLCs, distributed controllers, etc. as well as combinations of these devices.

Press 10 further contains a rubber membrane 39 with an air inlet 19, a bottom sealing membrane 36, a double layer screen mesh 37, a cleaning mechanism 38, a vibrator 18, a liquid sump receptacle 22, a pneumatic rotating cylinder 25, and a pneumatic controller 26.

Filling step is initiated by a signal from level sensor 13, signaling the PLC that a sufficient amount of sludge or wastewater is present in tank 12. The end of the filling cycle is determined by counting time or by feedback from load cell 20, therefore allowing the filling time to vary between cycles, assuring the shortest possible filling, regardless of other process parameters. A control algorithm in PLC 21 analyses the signals from load cell 20 throughout the stages and dynamically adjusts the cycle duration as a function of the weight of solids-liquid mixture inside apparatus 10.

Following the filling cycle, there follows the pressing, unloading and subsequent cycles which are be explained hereinafter.

At the end of the unloading cycle, the unloaded weight of the solids 32 dumped into container 27, is registered by the PLC for logistic or other purposes.

Apparatus 10 is firmly mounted on a metal structure 23, above a solids container 27. The liquid that is pressed from the sludge or wastewater is discharged onto a sump 22 and then from pipes 29 or 30, depending on the state of a directional valve 28, to the sewage, or back to the sludge or to a wastewater storage tank.

Details of the operation cycle for one embodiment are further illustrated in the following drawings.

Figure 2B:
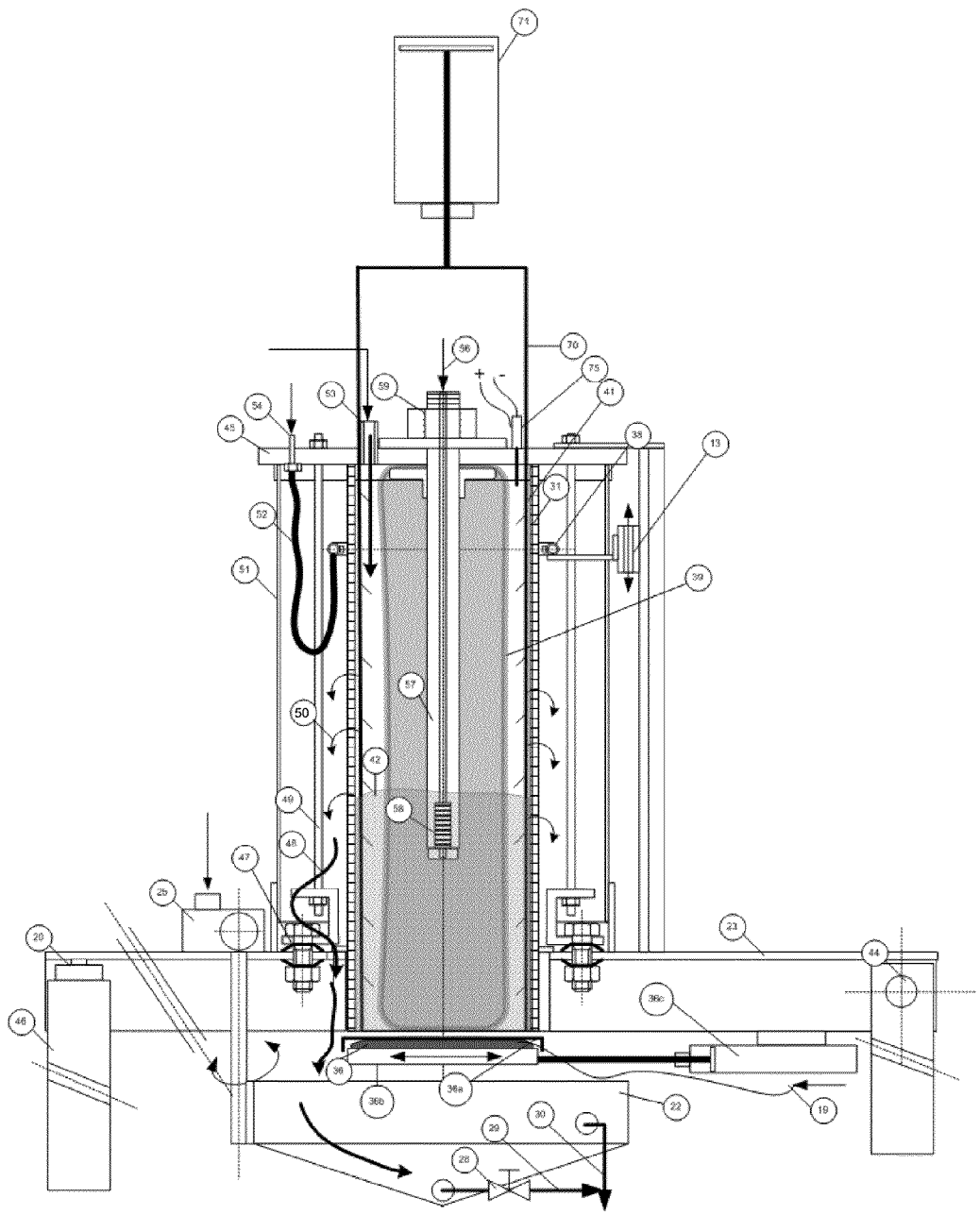

There is seen in FIGS. 2a and 2b, a sectional view of embodiments of the apparatus with the internal parts thereof, during a filling cycle. A flocculated and coagulated mixture 42 of solids and liquid, or wastewater is entering via port 53 onto a cylindrical void found between the internal fine mesh screen 41, preferably of 60-200 mesh, which is supported by an external cylindrical coarse mesh screen 31, preferably 4-10 mesh, and assembled onto a cylindrical pipe housing 55, which is further attached by rods 49, screws, bolts and Bellville® springs, and spring washers 47 to a main supporting structure 23, and the flexible rubber membrane 39, of 40-60 Shore hardness, made from natural rubber, EPDM, polyurethane, or other rubber types.

The clean liquid expressed from mixture 42 is percolated outwardly through a fine screen 41 and a coarse screen 31, and a flow 48 is drained into sump pan 22, which can be moved aside by pneumatic cylinder 25, and further via pipe 30 or 29 depending on the position of valve 28, while the flocculent solids are retained between fine mesh screen 41 and the squeezing action of a flexible rubber membrane 39. Low pressure air may be applied through port 19, at pressures of 0.5-16 bar, to the inside volume of rubber membrane 39, in order to accelerate the rate of percolation.

The solids-liquids mixture is prevented from a downward flow, by a second rubber membrane 36 being pressurized from port 56 at a regulated air pressure. Membrane 36 is made of the same material as membrane 39.

The net weight of the mixture as measured by load cell 20 varies with time, and the load cell measures the net weight accumulation of solids and liquid retained in the void between membrane 39 and screen 41. At the start of the filling cycle the net weight changes slowly since most of the liquid 50 percolates over screen 41, however, when the screen becomes partly clogged the rate of increase of the net weight rises, until the whole void is full, at which point the pressure in the void rises also, at about 0.5-16 bar filling pressure, whereupon an auto air regulator stops supplying air to air diaphragm pump which pumps mixture 42 through port 53, and no more mixture is fed thereinto. Thereupon load cell 20 detects the occurrence, the PLC sends a command to stop the filling and feeds of chemicals.

Other parts of a press which can be seen in these embodiments include the following:

the vertical supporting beams 46, the load cell moment release shaft 44, and a pneumatic rod less cylinder 40 which moves a set of nozzles 38, which receive the cleaning medium through a flexible tube 52 and a port 54. There is also seen a splash protector 51 which is made of metal or plastic;

a pipe 43, clamped by a bolt, which connects rubber membrane 36 to another pipe 57 by a screwed connection 58, and, similarly, an upper bolt 59 which connects membrane 39, to the top plate 45 with internal air conduits leading from ports 19 and 56; and metal pipes 43 and 57 which form air-tight connections with the membranes.

Figure 7A:
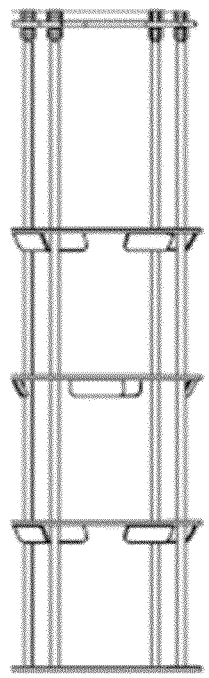
FIG. 7a is a side view of a scraper.
Figure 7B:
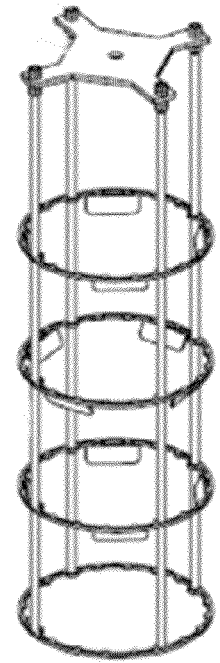
FIG. 7b is a perspective view of a scraper
Figure 7C:
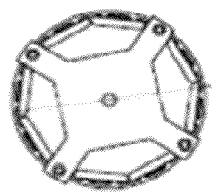
FIG. 7c is a top view of a scraper.
Figure 8A:
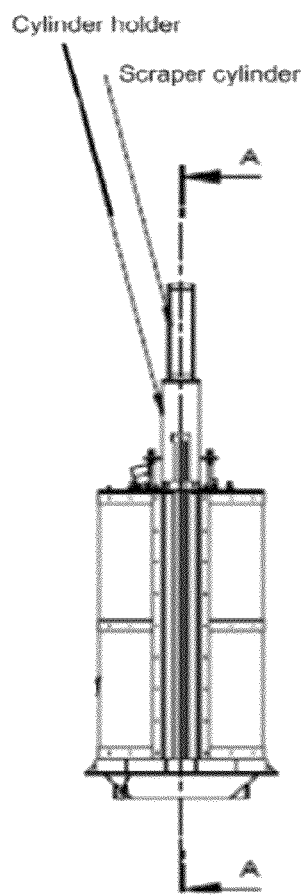
FIG. 8a is a side view of a filter apparatus showing the location of a scraper cylinder.
Figure 8B:
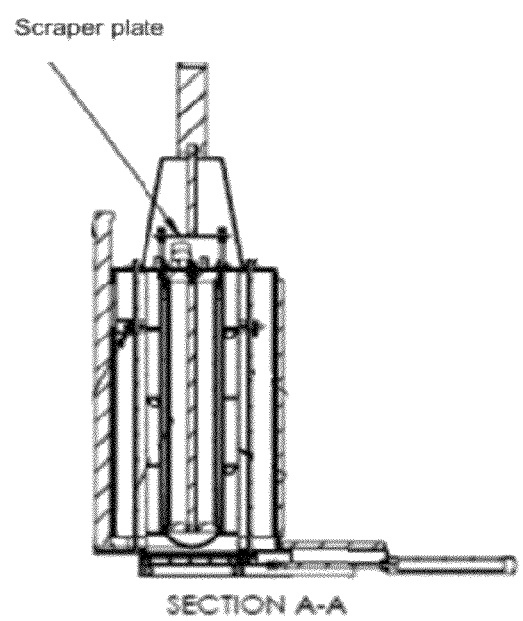
FIG. 8b is a section of FIG. 8a showing a scraper plate.
Figure 9:
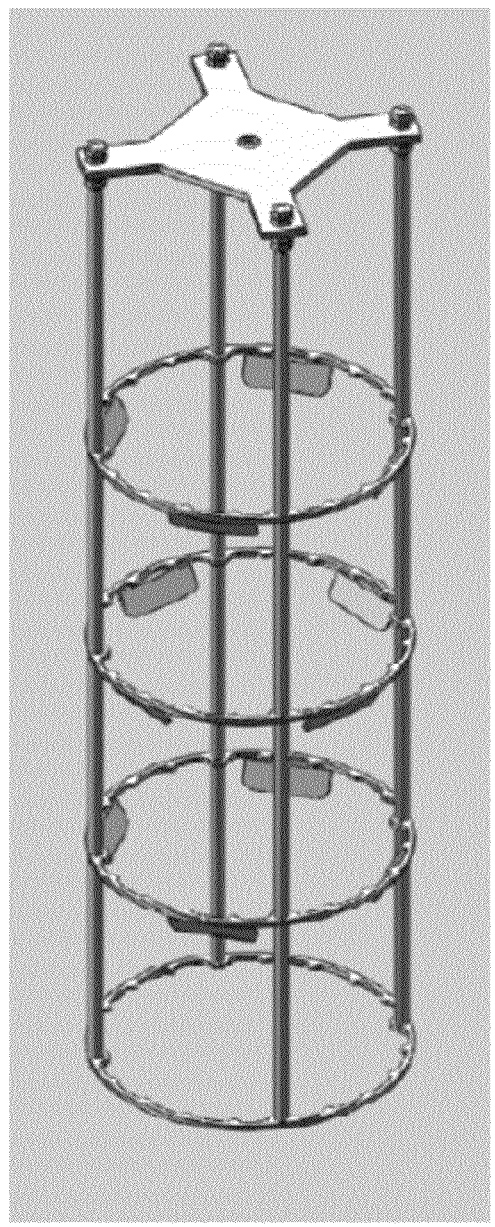
FIG. 9 is an enlarged perspective view of a scraper.
Figure 10:
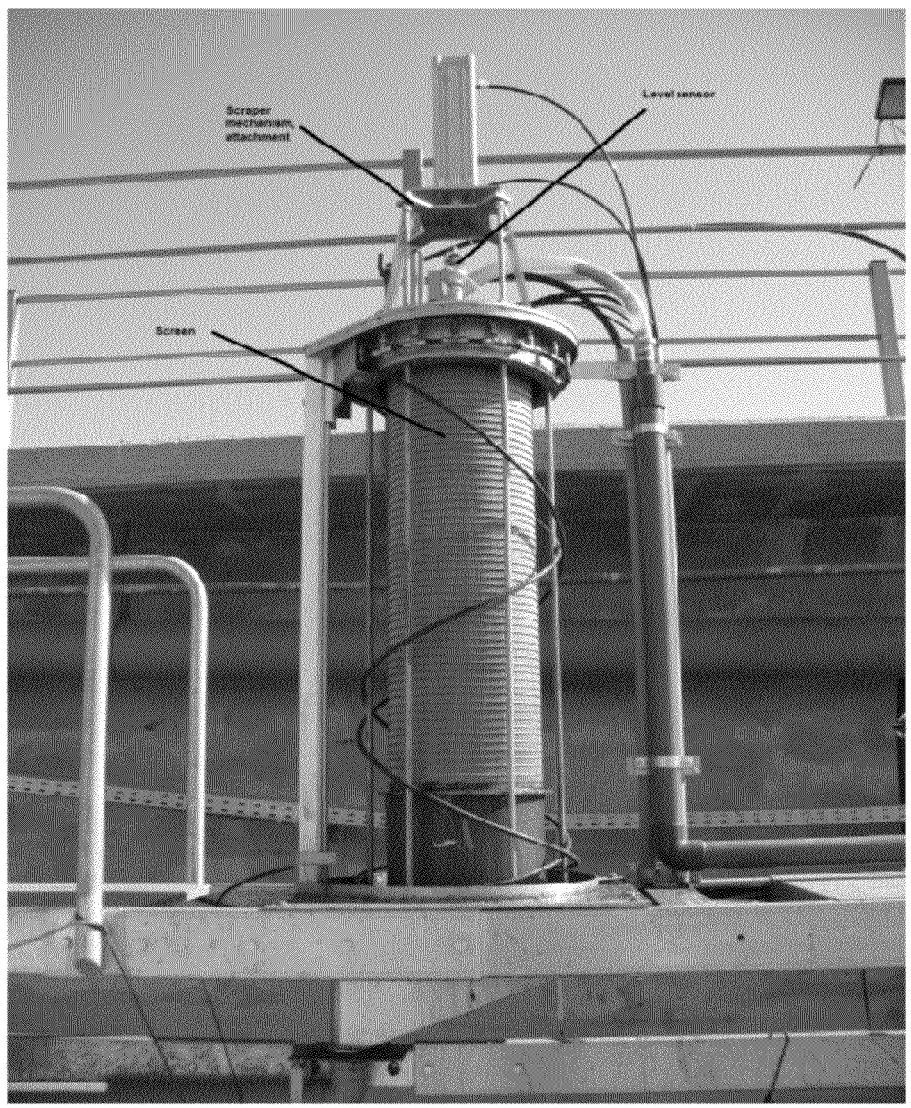
FIG. 10 is a side perspective view showing a scraper mechanism attachment.
Figure 11:
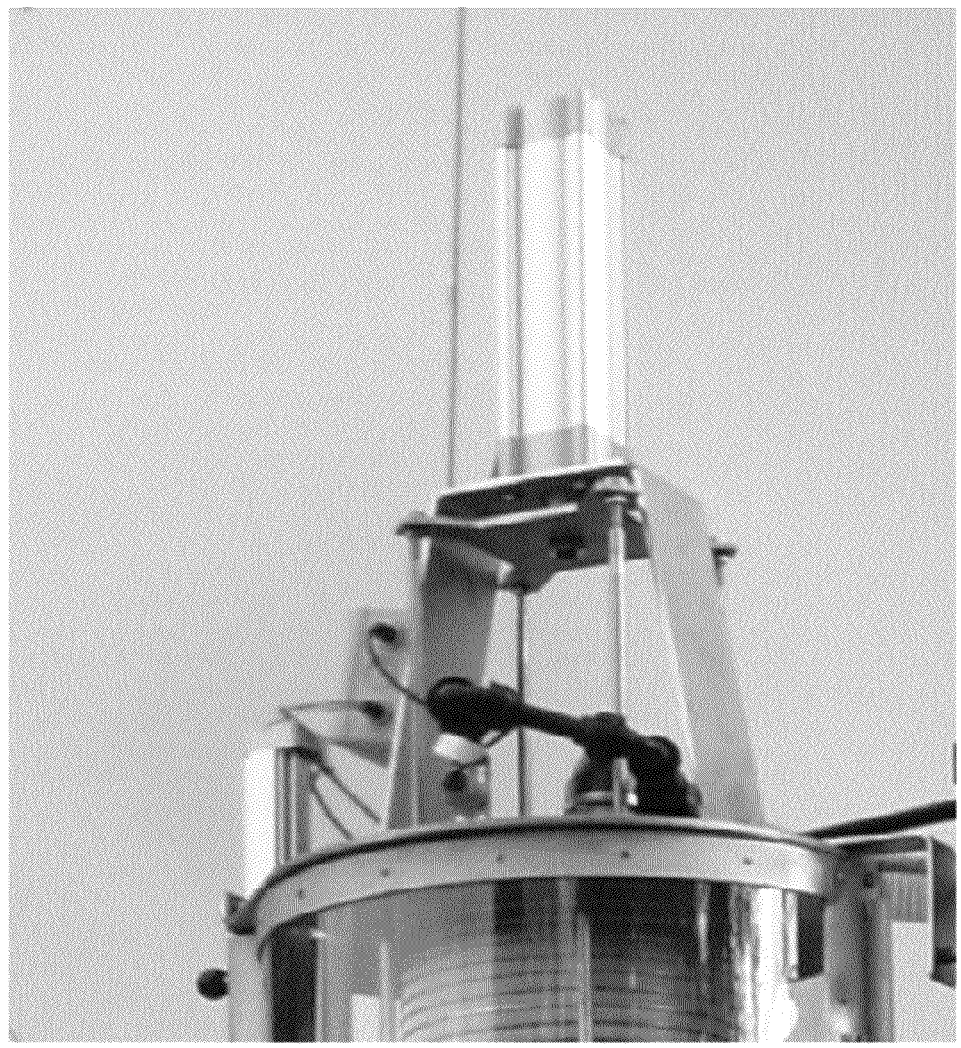
FIG. 11 is a side perspective view showing the scraper and actuator.

The scraper 70, shown in FIG. 2b, can be a construction of metal rings (as shown in FIG. 9) with blades as seen in FIGS. 7a and 7b, welded to the rings, those blades can assist in pushing down the dry sludge, and a tighten mechanism to an upper pneumatic or hydraulic cylinder 71 (FIGS. 10 and 11), when activated by the PLC, or other controller, while downloading the sludge, will promote the release and removing of the dewater sludge into a disposal container or sludge conveyor.

Figure 12:
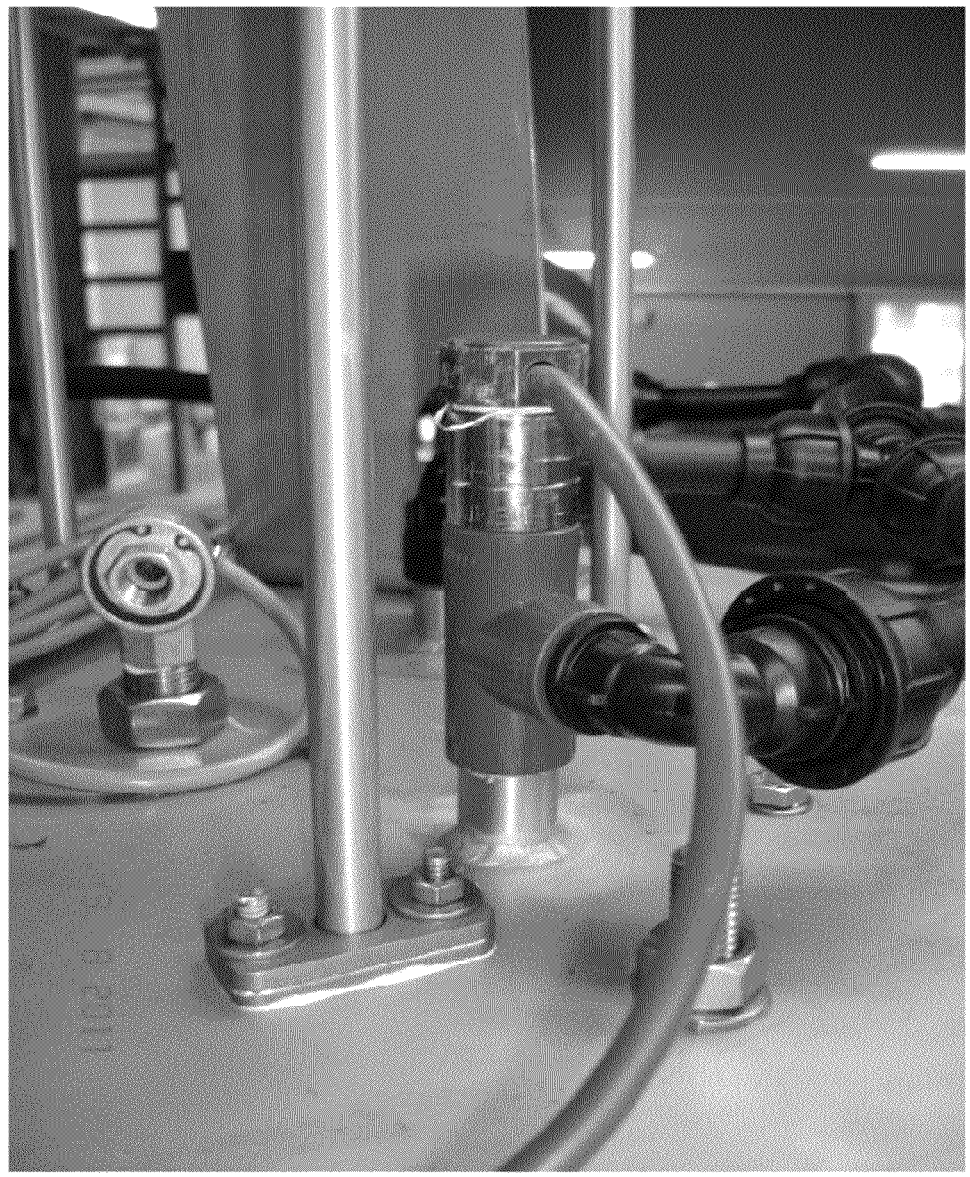
FIG. 12 is a view showing a level sensor.

When the sludge retained 42, is reaching the top, it will touch the electrode tip 75 (for example when using a multi-rod electrode level switch sensor), and an electrical circuit between the press body and the sludge will be closed and therefore a signal to the PLC or other controller will indicate that the cylindrical tank is full and pressing operation can start. The general assembly of such a sensor can be seen in, for example, in FIG. 12 and at http://www.globalw.com/support/wl200install.html.

Figure 16:
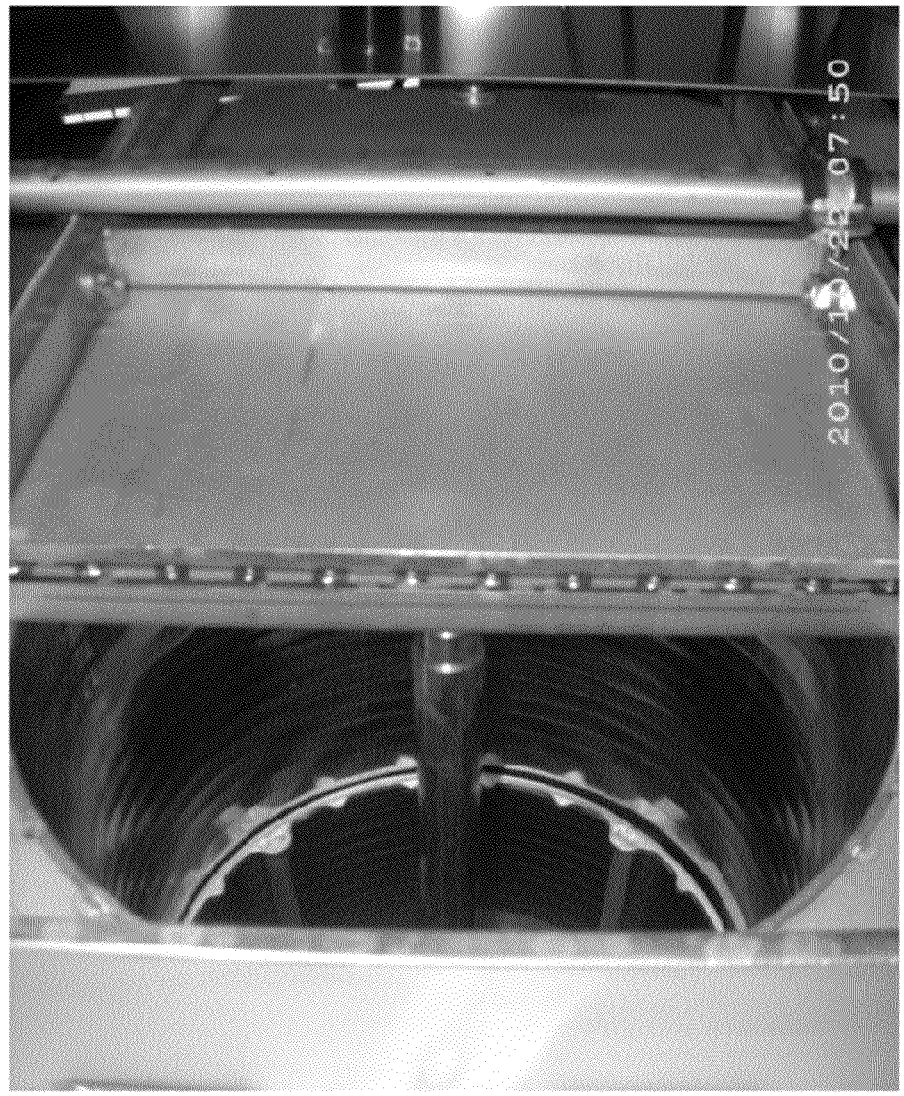
FIG. 16 is a view of a bottom sealing membrane.

Also in FIG. 2b we can see the new designed bottom sealing membrane 36, this flat membrane push up the sealing plate 36a while inflated against the bottom opening, supported by a sliding plate 36b, and open side way when deflated by cylinder 36c, a semi open bottom sealing mem assembly can be seen in FIG. 16.

Figure 13:
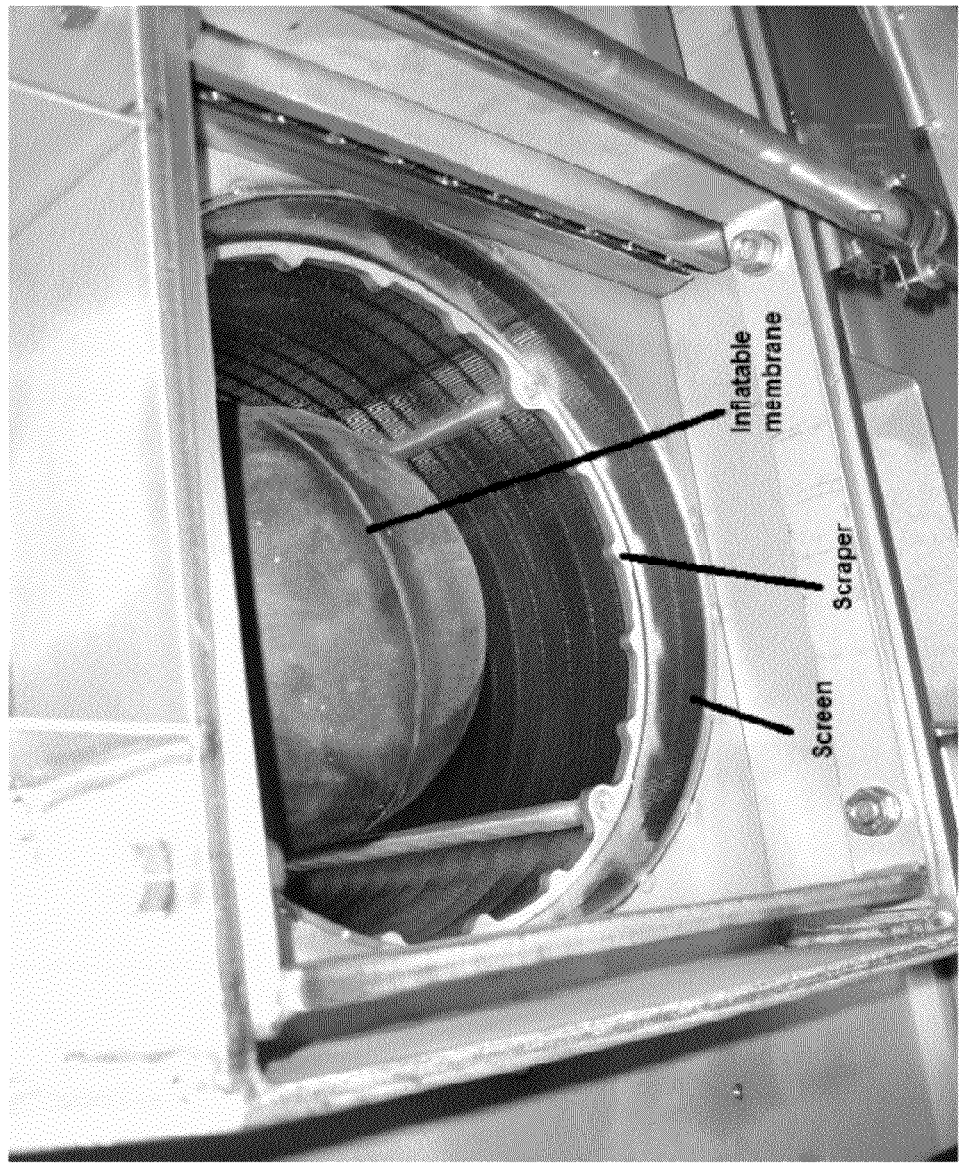
FIG. 13-15 are different views of a screen.
Figure 14:
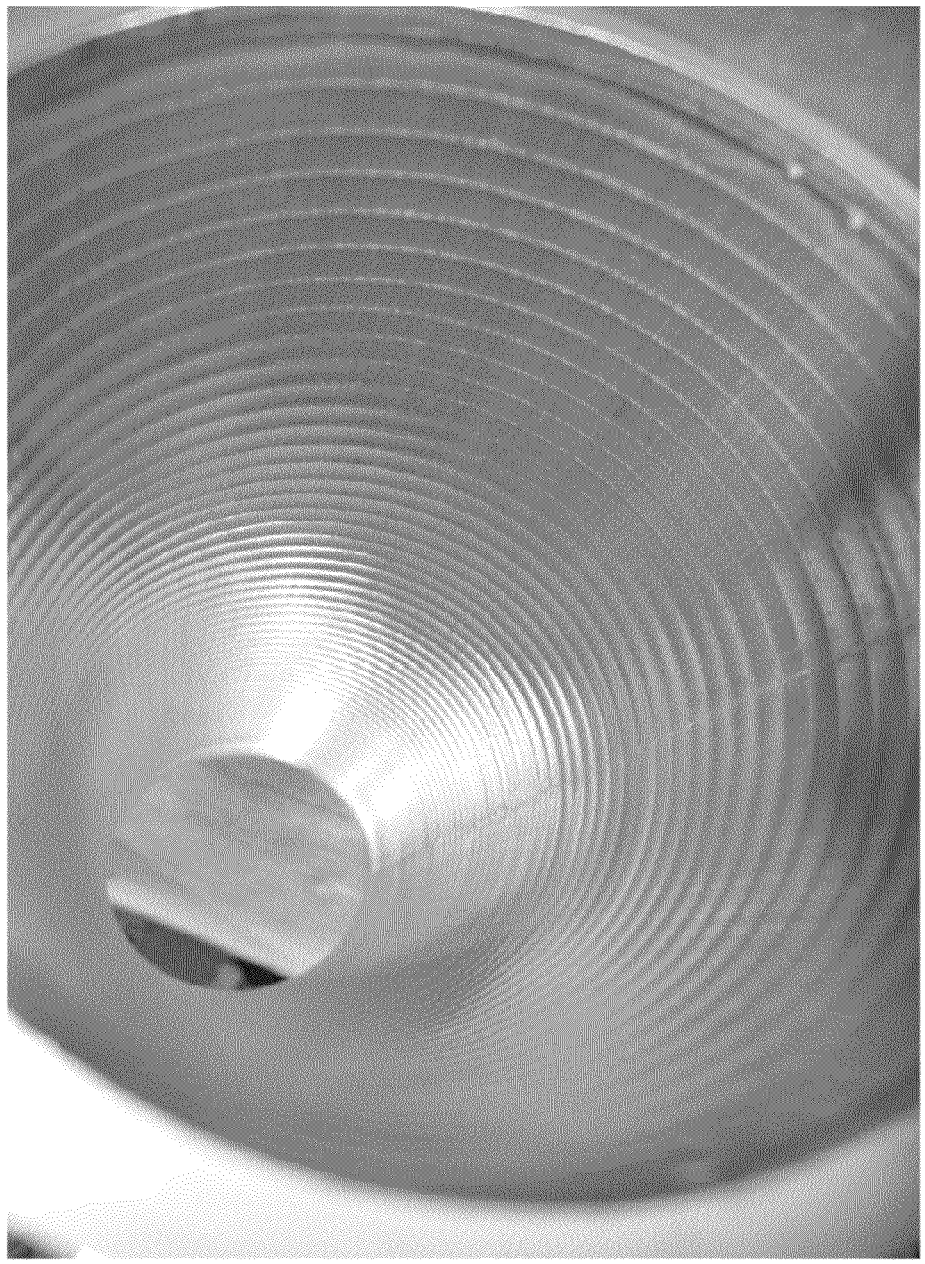
Figure 15:
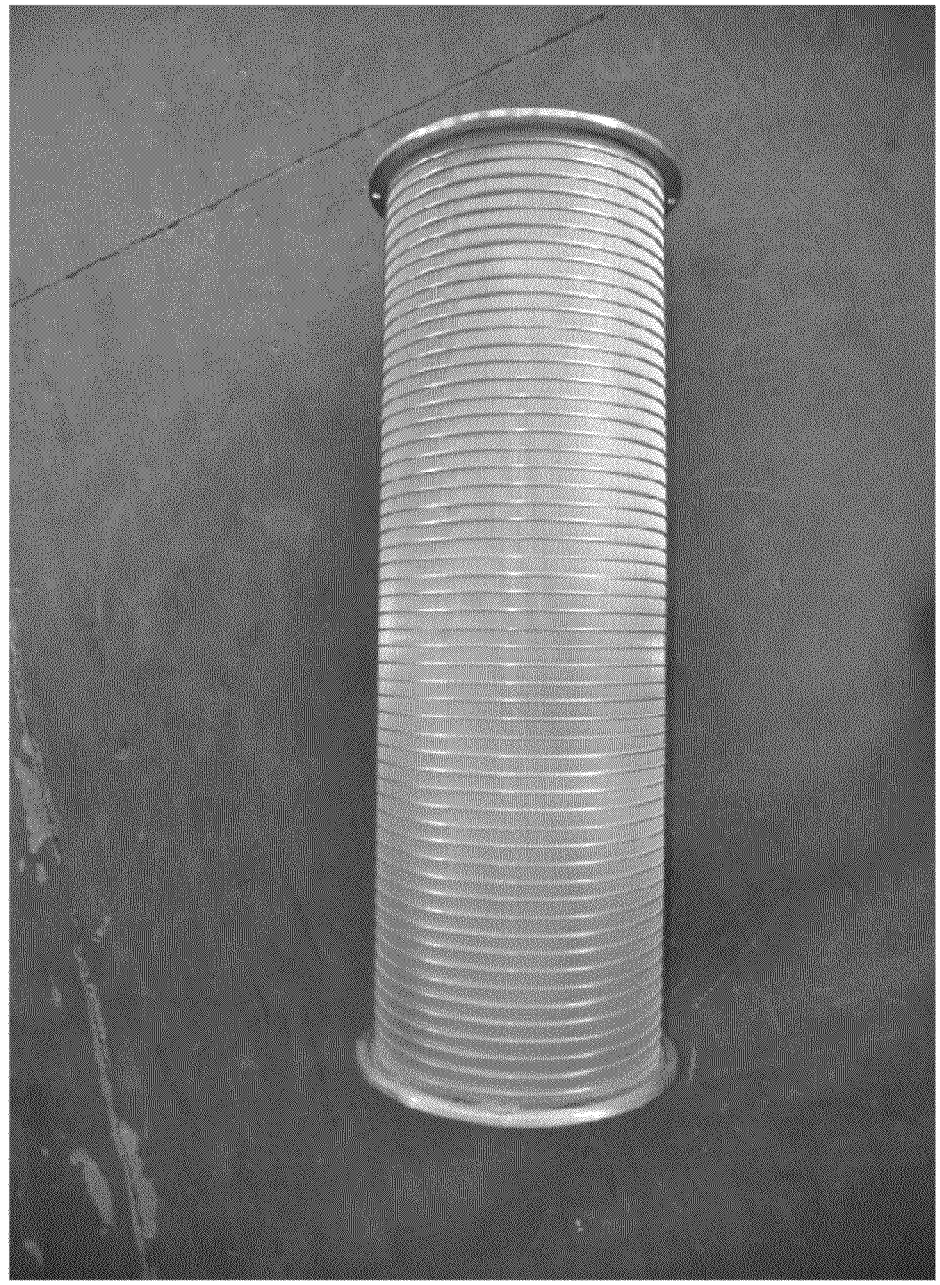

In one embodiment, the screen can be a round shape cylindrical, open both sides, its duty is to hold the cake and allow water to percolate outside, see FIGS. 13-15.

There is seen in FIG. 3, a sectional view of the press with the internal parts thereof, during a pressing cycle.

The pressing cycle follows the filling cycle wherein the lower bottom remains closed by membrane 36, which receives air pressure of 4-16 bars from port 56, while membrane 39 receives compressed air via port 19, thereby inflating the membrane and pressing the solids-liquid mixture against screen 41, causing a formation of cake 60, having a thickness of 5-50 mm, according to the pre-programmed parameters in the PLC, which monitors cake thickness via input from load cell 20.

Excess liquid 48 is drained off, through the lower pan 22, via pipes 29, or 30, controlled by manual or automatic valve 28.

The end of a cycle is determined either by weight measurement via load cell 20, by reaching the pre-programmed weight value, or by time count, whichever comes first.

Another option for stopping the pressing cycle is by the measurement of weight loss rate, in order to determine when the rate of loss is below the end value of the pressing cycle.

There is seen in FIG. 4 a sectional view of the apparatus with the internal parts thereof, during an unloading cycle. The bottom opening membrane 36 is opened, by relieving the air, thereby creating a passage to void 61.

Upper membrane 39 is contracted as a result of air being released, and, at this point, a vibrator 18 may be activated to apply vertical vibration that causes a dewatered solids layer 60 to detach from a screen 41 surface, with the vibrator being activated continuously or periodically according to a program stored in the PLC. Air may be blown from a ring 38 of nozzles surrounding external screen 31. Air is delivered to the nozzles via port 54. Ring 38 is capable of being moved up and down by the action of an air piston 40. This vertical movement enables a thorough, air backwashing of the whole surface of screen 41, thereby assuring a successful detachment of solids layer 60.

Dry solid layer 60 collapses and accumulates in a solids container 27.

There is seen in FIG. 5 a sectional view of the press with the internal parts thereof, during a screen cleaning cycle.

Following unloading of the press apparatus, and before starting a new set of cycles, a screen 41 surface must be free and clean of dirt. Screen 41 may be permanently coated with a layer of a non-stick material such as Teflon®, or sprayed with a material of similar properties, to prevent dirt adhesion. Some solids will always be retained on the screen surface, however, and this cycle serves to remove the remaining dirt with minimum amount of backwashing liquids such as water.

A liquid sump or a receiver 22, is swung into position by a pneumatic actuator 25, whereupon the main washing function is being performed by ring 38 of nozzles, preferably composed of about 10-30 nozzles. The nozzles generate a planar stream of liquid or air, the pressure thereof preferably being between 3 to 20 bars, and total backwashing flow rate preferably being between 5 to 20 liters per minute. The pressurized liquid is delivered from a port 54 to the movable ring of nozzles by a flexible pipe 52.

The nozzles circumferentially surround screen 31 and generate overlapping spray patterns. The clearance between exhaust tips of the nozzles to the external surface of screen 41 is preferably 10-50 mm.

The ring of nozzles is moved along the vertical axis upon a command from the PLC to a rodless pneumatic cylinder 40, whereupon the dirt trapped inside the holes in screen 37 is dislodged by liquid jets from nozzles 38, and can be seen contained in stream 62 which flows downward, directed by a receiver 22 and ducted exterior to the press apparatus via pipe 29 or 30 as controlled by valve 28.

There is seen in FIG. 6, is a diagrammatic description of sludge and wastewater modes.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Further having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

Concepts

1. A multi-step press apparatus for automatic, PLC controlled, sludge dewatering and waste water filtration, comprising:
    a substantially cylindrical tank for receiving a mixture of sludge or waste water and coagulant, said cylindrical tank being designed to effectively allow suspended solids to be separated and later dewatered, and being provided with a lower, openable port for discharge of dewatered solids and having a substantially vertical cylindrical double layer mesh wired screen for discharge of cleared liquid;
    a centralized inflatable membrane, positioned to press said solids against said screen, whereby a stream of discharged, cleared liquid, passes through the screen and is discharged to a sewage drain or a further tank, said screen being provided with perforations sized to enable the passage of clear liquid therethrough while retaining fine and coagulated solids on the internal surface thereof;

a load sensor in contact with the cylindrical tank to determine the combined weight of the apparatus and of solid and liquid internally retained thereon and to control the sequence of operation, and the filling and pressing duration as a function of said weight, whereby a solids cake of about 30 mm thickness of fine and coagulated solids is formed and retained on the internal surface of the fine screen layer, thereby improving the filtering and dewatering capacity of the apparatus, said apparatus further comprising:

a bottom opening with a second pneumatic inflatable membrane to seal and to open said bottom opening and thereby enabling downward discharge of solids into a sludge collecting bin;

a set of high pressure nozzles located on the external side of the mesh screen body, to efficiently wash the screen from outside to inside, said nozzles being operationally linked to a drive mechanism which moves said nozzle assembly up and down in response to a PLC command during the cleaning cycle; and a PLC provided to manage all cycles of operation along with pneumatic and other electrical control items to activate solenoid valves, pumps and load cells, to provide for a continuous dewatering and filtration operation.

2. A press apparatus according to concept 1 further comprising a first tank provided with a sludge or waste water inlet pipe to supply sludge or waste water comprising a mixture of solids and liquid to said first tank, a pumping device, and a means for adding a coagulant to the sludge or waste water and an outlet pipe leading to said cylindrical tank.

3. A press apparatus according to concept 1, wherein said inflatable membrane is formed of rubber and is pneumatically inflatable.

4. A press apparatus according to concept 1, wherein said inflatable membrane is formed of rubber and is hydraulically pressurized.

5. A press apparatus according to concept 1 further comprising a pneumatic vibrator to improve the detachment of solids from the internal screen of said double layer mesh wired screen.

6. A press apparatus according to concept 1 further comprising a liquid collecting sump pan, which is pneumatically displaceable, upon the washing cycle, said liquid collecting sump pan being located below the press bottom to collect the washing liquid into the sewage system or back to the processing tank.

7. A press apparatus according to concept 1, wherein said screen is coated with a non-stick material.

8. A press apparatus according to concept 1, wherein said load sensor is used for determining the rate of weight loss of said combined weight.

9. A press apparatus according to concept 1, wherein said coagulants are selected from the group consisting of alum, ferric chloride, ferric sulfate, ferrous sulfate, titanium dioxide, lime, polyacrylates, cationic polyamines, cationic resin amines, cationic polyacrylamides and anionic polyacrylamides.

10. A press apparatus according to concept 1, wherein said set of nozzles is disposed generally surrounding said external side of said screen.

11. A press apparatus according to concept 10, wherein said set of nozzles contains about 10 to about 30 nozzles.

12. A press apparatus according to concept 1, wherein each of said nozzles ejects a jet of liquid.

13. A press apparatus according to concept 1, wherein each of said nozzles ejects a jet of air.

I claim:

1. A multi-step press apparatus for automatic sludge dewatering and waste water filtration, comprising:

a substantially cylindrical tank for receiving a mixture of sludge or waste water and coagulant, wherein
   said cylindrical tank being designed to effectively allow suspended solids to be separated and later dewatered, and
   being provided with a lower, openable port for discharge of dewatered solids and
   having a substantially vertical cylindrical filter screen for discharge of cleared liquid;

a centralized inflatable membrane, positioned to press said solids against said screen, whereby a stream of discharged, cleared liquid, passes through the screen and is discharged to a sewage drain or a further tank, said screen being provided with perforations sized to enable the passage of clear liquid there through while retaining fine and coagulated solids on the internal surface thereof;

a level sensor to detect when said tank has received sufficient sludge or waste water as to render the tank substantially full and to control a sequence of operation, and a filling and pressing duration as a function of said level, whereby a solids cake of about 30 mm thickness of fine and coagulated solids is formed and retained on the internal surface of the cylindrical filter screen, thereby improving the filtering and dewatering capacity of the apparatus, said apparatus further comprising:

a bottom opening with a second pneumatic inflatable membrane to seal and to open said bottom opening and thereby enabling downward discharge of solids into a sludge collecting bin;

a nozzle assembly including a set of high pressure nozzles located on the external side of the screen, to wash the screen from outside to inside, said nozzles being operationally linked to a drive mechanism which moves said nozzle assembly up and down in response to a controller command during a cleaning cycle; and a controller provided to manage all cycles of operation along with pneumatic and other electrical control items including activating solenoid valves, pumps and load cells, to provide for a continuous dewatering and filtration operation.

2. The press apparatus of claim 1 further comprising a pneumatic activated scraper to detach solids from the screen.

3. The press apparatus of claim 1, wherein said level sensor generates a signal which can be used to determine a rate of filling.

4. The press apparatus of claim 1, wherein the level sensor is located on top of the substantially cylindrical tank.

5. The press apparatus of claim 1, wherein the controller is a PLC.

* * * * *